(12) United States Patent
Hill

(10) Patent No.: US 7,157,649 B2
(45) Date of Patent: Jan. 2, 2007

(54) CONTACT SENSITIVE DEVICE

(75) Inventor: Nicholas P. R. Hill, Cambridge (GB)

(73) Assignee: New Transducers Limited, London (GB)

( * ) Notice: Subject to any disclaimer, the term of this patent is extended or adjusted under 35 U.S.C. 154(b) by 0 days.

(21) Appl. No.: 09/746,405

(22) Filed: Dec. 26, 2000

(65) Prior Publication Data

US 2001/0006006 A1    Jul. 5, 2001

Related U.S. Application Data

(60) Provisional application No. 60/242,618, filed on Oct. 23, 2000, provisional application No. 60/171,603, filed on Dec. 23, 1999.

(30) Foreign Application Priority Data

Dec. 23, 1999  (GB) ................................. 9930404.0
Oct. 20, 2000  (GB) ................................. 0025771.7

(51) Int. Cl.
    *G06F 3/043*    (2006.01)
(52) U.S. Cl. ............................... 178/18.04; 178/18.01; 178/18.03; 345/160; 345/169; 345/173; 345/177
(58) Field of Classification Search ............ 178/18.04, 178/18.01, 18.03, 19.01, 19.02, 20.02, 20.03; 345/177, 173, 160, 169; 367/129, 907
    See application file for complete search history.

(56) References Cited

U.S. PATENT DOCUMENTS

| | | | | |
|---|---|---|---|---|
| 4,246,439 A | * | 1/1981 | Romein ................... | 178/19.02 |
| 4,389,711 A | * | 6/1983 | Hotta et al. ............. | 178/18.03 |
| 4,393,268 A | | 7/1983 | Guedj et al. | |
| 5,161,126 A | * | 11/1992 | Marcus ..................... | 367/907 |
| 5,162,618 A | | 11/1992 | Knowles | |
| 5,262,777 A | | 11/1993 | Low et al. | |
| 5,305,239 A | * | 4/1994 | Kinra ......................... | 702/39 |
| 5,329,070 A | * | 7/1994 | Knowles .................. | 178/18.04 |

(Continued)

FOREIGN PATENT DOCUMENTS

DE    4143364    9/1993

(Continued)

OTHER PUBLICATIONS

Bendat et al., Engineering Applications of Correlation and Spectral Analysis, Chapter 6 entitled "Propagation Path Identification" and Chapter 7 entitled "Single Input/Multiple Output Problems," A Wiley-Interscience Publication, 1980, pp. 121-167.

(Continued)

*Primary Examiner*—Richard Hjerpe
*Assistant Examiner*—Leonid Shapiro
(74) *Attorney, Agent, or Firm*—Zagorin, O'Brien, Graham LLP

(57) ABSTRACT

Method and apparatus using bending wave vibration to calculate information relating to a contact on a contact sensitive device. The contact sensitive device has a member capable of supporting bending waves, and a device attached to the member measures bending wave propagation in the member to determine a measured bending wave signal. The measured bending wave signal is processed to calculate information relating to the contact. The contact sensitive device may comprise a transparent touch sensitive plate mounted in front of a display device. A stylus (e.g., pen) may be used for writing text or other matter on the touch-sensitive plate. The plate may also be an acoustic device. Three transducers are mounted on the plate. At least two of the transducers are sensing transducers and are thus sensitive to and monitor bending wave vibration in the plate.

80 Claims, 8 Drawing Sheets

U.S. PATENT DOCUMENTS

| | | | |
|---|---|---|---|
| 5,412,189 A | 5/1995 | Cragun | 235/379 |
| 5,541,372 A * | 7/1996 | Baller et al. | 178/18.01 |
| 5,591,945 A | 1/1997 | Kent | |
| 5,628,031 A | 5/1997 | Kikinis et al. | 395/893 |
| 5,637,839 A | 6/1997 | Yamaguchi et al. | |
| 5,638,093 A * | 6/1997 | Takahashi et al. | 178/19.02 |
| 5,691,959 A | 11/1997 | Kriewall et al. | |
| 5,717,432 A | 2/1998 | Miwa et al. | |
| 5,717,434 A | 2/1998 | Toda | |
| 5,831,934 A * | 11/1998 | Gill et al. | 367/25 |
| 5,838,088 A | 11/1998 | Toda | |
| 5,856,820 A * | 1/1999 | Weigers et al. | 178/18.04 |
| 5,877,458 A * | 3/1999 | Flowers | 178/18.01 |
| 5,986,224 A * | 11/1999 | Kent | 178/18.01 |
| 6,049,328 A * | 4/2000 | Vanderheiden | 341/21 |
| 6,072,475 A * | 6/2000 | van Ketwich | 345/156 |
| 6,091,406 A * | 7/2000 | Kambara et al. | 178/18.04 |
| 6,157,373 A * | 12/2000 | Rego | 345/173 |
| 6,160,757 A * | 12/2000 | Tager et al. | 367/119 |
| 6,246,638 B1 * | 6/2001 | Zook et al. | 367/140 |
| 6,335,725 B1 * | 1/2002 | Koh et al. | 345/173 |
| 6,366,277 B1 * | 4/2002 | Armstrong | 345/173 |
| 6,384,743 B1 * | 5/2002 | Vanderheiden | 340/407.1 |
| 6,400,996 B1 * | 6/2002 | Hoffberg et al. | 345/810 |
| 6,414,673 B1 * | 7/2002 | Wood et al. | 345/173 |
| 6,580,799 B1 * | 6/2003 | Azima et al. | 381/333 |
| 2001/0026625 A1 * | 10/2001 | Azima et al. | 381/152 |
| 2002/0125065 A1 * | 9/2002 | Bank | 181/161 |
| 2002/0135570 A1 | 9/2002 | Iisaka et al. | |
| 2003/0066692 A1 | 4/2003 | Devige et al. | |

FOREIGN PATENT DOCUMENTS

| | | |
|---|---|---|
| EP | 0 296 569 A2 | 12/1988 |
| EP | 0 526 879 A1 | 2/1993 |
| EP | 0 597 228 A2 | 5/1994 |
| EP | 0 656 603 A1 | 6/1995 |
| FR | 2787603 A1 | 6/2000 |
| FR | 2787608 | 6/2000 |
| GB | 0116310.4 | 6/1918 |
| GB | 2 301 217 | 11/1996 |
| JP | 08-297534 | 11/1996 |
| WO | WO 84/00427 | 2/1984 |
| WO | WO 94/02911 A1 | 2/1994 |
| WO | WO 96/11378 A1 | 4/1996 |
| WO | WO 97/09842 * | 3/1997 |
| WO | WO 97/09847 * | 3/1997 |
| WO | WO 99/65274 | 12/1999 |
| WO | WO 00/38104 A1 | 6/2000 |
| WO | WO 01/43063 A1 | 6/2001 |
| WO | WO 02/01490 A1 | 1/2002 |

OTHER PUBLICATIONS

U.S. Appl. No. 09/869,432, filed Aug. 21, 2001, Chapman et al.

U.S. Appl. No. 10/482,865, filed Jan. 5, 2004, entitled Contact Sensitive Device, by Darius Martin Sullivan, inventor.

U.S. Appl. No. 10/751,588, filed Jan. 5, 2004, entitled Contact Sensitive Device, by Darius Martin Sullivan, inventor.

U.S. Appl. No. 10/729,540, filed Dec. 5, 2003, entitled Contact Sensitive Device, by Darius Martin Sullivan, inventor.

"Touch Sensitive Device Employing Impulse Reconstruction", U.S. Appl. No. 10/750,290, filed Dec. 31, 2003, Nicholas P.R. Hill and Darius M. Sullivan, inventors.

"Touch Sensing with Touch Down and Lift Off Sensitivity", U.S. Appl. No. 10/750,291, filed Dec. 31, 2003, Nicholas P.R. Hill and Darius M. Sullivan, inventors.

"Touch Sensitive Device Employing Bending Wave Vibration Sensing and Excitation Transducers", U.S. Appl. No. 10/750,502, filed Dec. 31, 2003, Nicholas P.R. Hill and Darius M. Sullivan, inventors.

Brink, M.C., "The Acoustic Representation of Bending Waves", Laboratory of Acoustic Imaging and Sound Control Delft University of Technology, Nov. 2002, pp. i-69.

* cited by examiner

Graph of a dispersive impulse response

Graph of a dispersive frequency response

Graph of a non-dispersive frequency response

Graph of a non-dispersive impulse response

CONTACT SENSITIVE DEVICE

This application claims the benefit of provisional application No. 60/171,603, filed Dec. 23, 1999 and provisional application No. 60/242,618, filed Oct. 23, 2000.

TECHNICAL FIELD

The invention relates to contact sensitive devices, e.g. devices that detect and process information based on the location of a transient contact made on a panel or screen.

BACKGROUND ART

Visual displays often include some form of touch sensitive screen. This is becoming more common with the emergence of the next generation of portable multimedia devices such as palmtop computers. The most established technology using waves to detect contact is Surface Acoustic Wave (SAW), which generates high frequency waves on the surface of a glass screen, and their attenuation by the contact of a finger is used to detect the touch location. This technique is "time-of-flight," where the time for the disturbance to reach one or more sensors is used to detect the location. Such an approach is possible when the medium behaves in a non-dispersive manner, i.e. the velocity of the waves does not vary significantly over the frequency range of interest.

SUMMARY OF THE INVENTION

According to the invention, there is provided a method of determining information relating to a contact on a contact sensitive device comprising the steps of:
 providing a member capable of supporting bending wave vibration,
 contacting the member at a discrete location to produce a change in bending wave vibration in the member,
 measuring the changed bending wave vibration in the member to determine a measured bending wave signal, and
 processing the measured bending wave signal to calculate information relating to the contact.

The contact may be in the form of a touch from a stylus or a finger. The stylus may be in the form of a hand-held pen.

The information calculated may be the location of the contact or may be other information, e.g. pressure or size of the contact. The information relating to the contact may be calculated in a central processor.

The bending wave propagation may be measured by at least one sensor which may be mounted at or spaced from an edge of the member. The sensor may be in the form of a sensing transducer which may convert bending wave vibration into an analogue input signal. There may be more than one sensor.

By bending wave vibration it is meant an excitation, for example by the contact, which imparts some out of plane displacement to the member. Many materials bend, some with pure bending with a perfect square root dispersion relation and some with a mixture of pure and shear bending. The dispersion relation describes the dependence of the in-plane velocity of the waves on the frequency of the waves. The relative magnitude of the vibration is determined by material properties of the member and the frequency of excitation.

Bending waves are dispersive, i.e. the bending wave velocity is dependent on frequency. This property makes any "time-of-flight" approach inappropriate, as the signature of the disturbance progressively spreads out in time. Accordingly, the method further comprises the step of applying a correction to convert the measured bending wave signal to a propagation signal from a non-dispersive wave source. Once the correction is applied, techniques used in the fields of radar and sonar may be applied to detect the location of the contact.

One significant advantage of using bending wave propagation is that bending waves are bulk waves, which involve the movement of the whole member, and not just the surface. In contrast, most of the alternative touch sensing technologies rely on surface effects and as such are vulnerable to surface damage. Accordingly, a contact sensitive device using bending waves should be more robust and less sensitive to surface scratches, etc.

Applying the correction may be the first step in processing the bending wave signal. The correction applied is preferably based on the dispersion relation of the material of the member supporting the bending waves. This dispersion relation may be modeled by using the bending wave equation in combination with known physical parameters of the material of the member. Alternatively, the dispersion relation may be measured by using a laser vibrometer to create an image of the vibration pattern in the member for a number of given frequencies to give the dispersion relation in the frequency range of interest.

The measuring of bending wave propagation may be done by continually sampling the motion in the member. By comparing the measured bending wave signal with a reference signal, for example the signal before a contact is made, it may be possible to identify when contact is made. The magnitude or other characteristics of the signal may be compared. Once contact has been made, the measured bending wave signal may be recorded and may then be processed.

The member may be in the form of a plate or panel. The member may be transparent or alternatively non-transparent, for example having a printed pattern. The member may have uniform thickness. Alternatively, the member may have a more complex shape, for example a curved surface and/or variable thickness. Provided it is possible for bending waves to travel from the contact position to one of the sensors (by whatever complex path), the method may be adapted for complex shaped members by providing an adaptive algorithm such as a neural net to decipher the contact location from the bending wave signal received by the sensor. It may be necessary to have several sensors.

The method may involve purely passive sensing, in other words, the change in bending wave vibration in the member induced by the contact may be the excitation to bending wave vibration in the member. In other words, there is no other source of bending wave vibration for a passive sensor. The position of the contact may be calculated by recording the time of arrival of an impulse at each sensor, comparing the times to determine the relative distances of each sensor from the origin of the impulse and intersecting the relative distances to give the position of the contact. The bending wave vibration and hence the measured bending wave signal may be generated by an initial impact or by frictional movement of the contact. There may be a minimum of three sensors.

Increasing the number of sensors used to detect the contact or contact location provides extra information and thus may provide a more accurate detection. Alternatively or additionally, the bending wave signal received at each sensor may be analysed over a longer period of time such that not only the direct signal, i.e. the signal when the impulse first reaches the transducer, is measured but also the reflections from the edges of the member. This approach is similar to adding mirrored versions of the or each existing sensor. Using this scheme, the extra information obtained may be used to provide greater accuracy or reduce the number of sensors.

After calculating the location of the contact, the measured bending wave signal may be further processed to determine additional information regarding the contact. The movement of a stylus on the member may generate a continuous signal which is affected by the location, pressure and speed of the stylus on the member. Continuous time data which may be derived from the continuous signal may be used to derive additional useful information in a variety of applications.

One application may be signature recognition which is a subset of the more general task of pattern recognition. Applications such as these, where patterns are drawn from complex data, benefit greatly from the extra independent information present in the continuous time data. The method may thus further comprise the step of implementing a neural net for processing continuous time data. The neural net may be trained by a set of examples, for example, a set of signatures written by a particular subject or a set generated from a knowledge of the typical variance caused by the human process of writing.

A fundamental property of a neural net is that the more independent information is available, the greater the accuracy of the conclusions drawn. Much of the information available in the continuous time data is completely independent from the position information, since it is connected to the velocity and pressure of the stylus on the surface of the member. Therefore the extra information increases the potential for accurate signature recognition. The method may further include the training of a second neural net with examples of time responses for signatures. Additional improvement may be achievable with training using further examples, either generated by the user or from knowledge of the expected variations in pressure and velocity.

Alternatively, the continuous time data may be used in handwriting recognition, the detection of a "double-click" or the detection of the strength of a contact, e.g. how hard a click. Both detection of "double-click" and click strength may be achieved with the image of the impulse shape in the continuous-time data. It may be possible to use a slower position sampling rate than other more conventional technology.

In contrast, conventionally the detection of a contact, be it pen, finger, etc., is performed at a pre-determined sample rate and the information concerning the contact location is built up from a set of points. There is no continuous time information and thus many of the applications described above may not be performed or may be performed less satisfactorily.

A measurement of the frequency content of the measured bending wave signal may be used to determine the contact type since the characteristic frequencies generated by each type of stylus differ. For example, a hard stylus will generate higher frequencies than a soft finger. Thus, a contact sensitive device for use with a hand-held pen-input device may be set up so as not to be triggered if the hand of the operator touches the contact sensitive device.

The differences in the frequency generated by different types of styli imply a difference in the absolute spatial resolution achievable; the higher frequency translates to a greater resolution. However, the resolution difference often coincides with the requirements for the contact in question. For example, the spatial resolution required for an input by a finger is usually less than the spatial resolution expected for a sharp-tipped stylus.

The frequencies generated by the contact are relatively low, i.e. generally audio frequencies rather than ultrasonic. Consequently, the member is preferably capable of supporting bending wave vibration in the audio range. Thus, a member similar to those used as an acoustic radiator in a loudspeaker may also be used to act as a contact sensitive device.

The contact sensitive device may further comprise an emitting transducer mounted on the member to generate bending wave vibration in the member to probe for information relating to the contact. The member may thus be an acoustic radiator and bending wave vibration in the member may be used to generate an acoustic output. Such vibration may be regarded as a noise signal, although there are other types of noise signal which may effect the passive sensing. When there is an external noise signal, the method may further comprise techniques to isolate the noise signal from the signal generated by the contact, for example:

1) Prediction filtering which predicts the response of the noise signal over a short time scale. Differences from the predicted value are more likely to be generated by a contact than by the emitting transducers.
2) Modelling the noise signal using a continuous logging of the audio signal produced, together with knowledge of the transfer function from the emitting transducer to the sensor. This allows a more accurate prediction of the noise signal than prediction filtering.
3) Using the multiple sensors to determine the location of the emitting transducer in the same manner as used to locate the contact (for example, intersection method). This information should facilitate the separation of the bending waves generated by the emitting transducer from the bending waves generated by the contact.

Alternatively, the noise signal may be used as an active probe of a contact in the member. Thus, the method may further comprise generating bending wave vibration in the member so that there is active sensing, in other words, sensing which relies not on the generation of waves by the contact but on the response of waves already present in the member to a mechanical constraint caused by the contact.

The bending waves in the member may be generated by a stimulus signal from a transducer mounted on the member. The transducer may have dual functionality, namely acting as an emitting transducer and a sensor. Alternatively, there may be an emitting transducer and at least one sensor mounted on the member.

The effect of the contact may be reflective, absorbing, or a combination of the two. For reflection, an emitting transducer generates bending waves, which are reflected by the contact and detected either by the same transducer or a separate sensor. The signal, either a time or frequency response, may then be processed with the material dispersion relation information to yield the distance travelled from the emitting transducer or source to the sensor via the contact.

One single measurement may be sufficient to differentiate between two contact locations which are a substantial distance apart. However, more information may be required to determine the contact location more accurately. This may be achieved by sensing the reflection with multiple sensors, where the stimulus signal may emanate from the emitting transducer or from a different source for some or all of the sensors. Either way, each sensor gives an independent measurement of the contact location, which may be combined to give a progressively more accurate contact location with increasing transducer number.

An alternative way to increase the location accuracy may be to measure the bending wave vibration in the member over a longer time, thus increasing the information in each measurement. In terms of a frequency response, this may correspond to a greater frequency resolution. The extended signal may also contain information concerning both direct and indirect reflection from the contact. Indirect reflection is a signal which arrives at the sensor from the contact via one or more boundary reflections. This method may be regarded as equivalent to adding further sensors at the mirror locations of the initial sensor, and may be employed to determine an accurate contact location with only one combined source/sensing transducer.

A self-measuring scheme may be incorporated into the contact sensitive device to measure the material dispersion relation in the member. When no contact is applied the boundary reflections are still present, which for a regular shape are manifest as strong reflections corresponding to the distances to each boundary. For a specific implementation, the emitting transducer, sensor and boundary locations are known which gives a set of known reference points. A smooth function representing the material dispersion relation may then be optimised to warp the frequency axis such that the periodicities corresponding to these reference points are restored. Further optimisation may be performed if required by adding other known reference points such as a contact in a pre-determined place.

This scheme allows an implementation of the active sensing technique without prior knowledge of the material dispersion relation. Alternatively it may be used to fine tune a correction for the small manufacturing tolerances present in the panel properties, or variations due to heat, humidity, etc.

Pure absorption requires a different implementation as compared to a scheme based on reflection. Thus the method may comprise implementing a "ray tracing scheme," where the effect of the contact is to interrupt a wave incident on one or more of the sensors. A wave incident on a sensor may be created by direct excitation, e.g. by one or more emitting transducers at an opposed location, or by indirect excitation from one or more boundary reflections. For indirect excitation, the emitting transducer may be located at any position, including a position adjacent to the sensor. Furthermore, indirect excitation allows detection of an absorbing contact from a single transducer, which acts as the source and the sensor of the boundary reflections.

Interruption of the incident wave may also result in diffraction about the absorption point. The effect of diffraction makes the absorptive approach sensitive to a much wider area than is the case for pure ray tracing. The contact location may be outside a direct path of the bending wave incident on the sensor and may still affect the signal received by the sensor. The information obtained by absorption may be in a more complex form than that for a reflecting contact. Consequently a more intelligent detection algorithm may be required, such as a neural net.

The stimulus signal generated by the transducer preferably has good noise rejection, and preferably does not have an audibly damaging or acoustically obvious effect. Thus, the stimulus signal may have a very small amplitude or may be similar to noise. For the latter, a particular correlation may be hidden in the noise for the calculations to latch onto. Alternatively, the stimulus signal may be made inaudible, i.e. ultrasonic by increasing the frequency above 20 kHz. This has the advantage that a large signal amplitude can be used and the high frequency translates into a high spatial resolution. However, the member must be capable of supporting such an ultrasonic signal. Many materials are suitable, for example, glass, crystal polystyrene.

The stimulus signal may be chosen from any one of the following signals:
1. Pulsed excitation—note this does suffer from poor noise rejection and audibility, if it has sufficient amplitude.
2. Band limited noise—this signal is less audibly damaging than most in any given frequency band and has the advantage that it may be tuned to the most suitable frequency band. In addition it may be made ultrasonic.
3. Steady state sine waves—these give good signal to noise but are extremely audible when in the audio band. Improvements are to place the frequency outside the audio band or use multiple closely spaced sines with random relative phase, thus making the signal audibly more noise-like. This is one example of a signal that is audibly noise-like, but has a hidden correlation that improves the signal to noise level. Another example of such a trace is an MLS (Maximum Length Sequence) signal.
4. A chirp signal—this is a widely used signal to determine a frequency response of a system over broad range of frequencies. However this may be practical only at ultrasonic frequencies, where it is not audible.
5. An audio signal—this may be fed into the transducers when the member is being used as an acoustic radiator for a loudspeaker. In this case there is no problem with the stimulus signal having an audibly damaging effect, as it is the very signal responsible for the intended audio output.

When a sensor and an emitting transducer are close together or the same transducer, a background signal produced by the emitting transducer is generally much greater than the signal of interest associated with the contact. This may introduce problems which may be alleviated in a number of ways. For example, for a pulsed excitation signal, the measurement at the sensor may be gated so that measurement starts after an outgoing wave produced by the emitting transducer has progressed further than the sensor. However, extended time stimulus signals are more common than pulsed excitation signals since the latter has poor noise rejection properties.

For an extended time stimulus signal there are mechanical or other techniques which may be used to improve the relative magnitude of the contact signature, for example:
1) Placing the sensor at approximately ¼ wavelength from the emitting transducer so that the magnitude of the outgoing wave detected at the sensor location is minimized. This technique may be used if the contact signal is limited to a relatively narrow range of frequencies.
2) Locating the emitting transducer and the sensor at one drive point and designing the emitting transducer and the sensor to couple into orthogonal physical properties. For example, a bender transducer and an inertially coupled transducer may be located at the same point. An outgoing wave generated by either transducer is not detected by the other. However, a secondary wave which is either reflected from the contact or boundaries is detected, maximising its relative magnitude.
3) Addressing the problem in the electrical domain. A measurement of the frequency response may be achieved with a swept sine wave and a demodulation stage. The outgoing wave from the emitting transducer produces a large background value of the frequency response upon which the fine structure due to smaller reflections from the contact is superposed. After demodulation (e.g. by a chirp demodulation circuit) the output may be a small ripple on a large smoothly varying background. Consequently, when this output is passed through a high pass filter the pertinent fine structure may be emphasised relative to the large background.

4) Digitising the measured signal with sufficient accuracy so that it is sensitive to the fine structure on top of the large background. The fine structure may then be emphasised with filtering in the digital domain.

Depending on the use of the transducer it may either be a two, three, or four terminal device. Two terminal devices may be used as sensors or emitting transducers separately. Alternatively they may be used as dual function transducers, where a sensing function is determined from the impedance of the device. Three and four terminal devices use a separate transducer as sensor and emitting transducer. For a three-terminal device the sensor and emitting transducer share a common electrode, whereas the sensor and emitting transducer are electrically isolated in the four-terminal device.

The or each emitting transducer or sensor may be a bender transducer which is bonded directly to the member, for example a piezoelectric transducer. The bender transducers are generally directional, which may be advantageous in some applications. The directivity achieved is determined by their physical shape and may therefore be tuned accordingly. Additional advantages include a high conversion efficiency, low cost, and considerable robustness.

Alternatively, the or each emitting transducer or sensor may be an inertial transducer which is coupled to the member at a single point. The inertial transducer may be either electrodynamic or piezoelectric. Inertial transducers are generally omni-directional, provided the contact point is small compared to the bending wavelength in the member at the frequency of interest.

The transducers and/or sensors may be placed with a relatively equal spacing around the edge or on the surface of the member subject to the specific topology of the application.

It may be possible to use audio transducers which are already in place as sensing and/or emitting transducers. This implementation may add the facility for a touch screen with the minimum of extra hardware. However, if this approach is not possible then small piezo elements might prove the most suitable transducers, as these are particularly suited to the ultrasonic frequencies which may be used for active sensing.

According to another aspect of the invention, there is provided a contact sensitive device comprising a member capable of supporting bending wave vibration, at least one sensor coupled to the member for measuring bending wave vibration in the member, and a processor operatively coupled to the sensor for processing information relating to a contact made on a surface on the member from the change in bending wave vibration in the member produced by the contact and measured by the sensor.

The contact sensitive device may be a passive sensor where bending wave vibration in the member is only excited by the contact and not by any other source. Alternatively, the contact sensitive device may be an active sensor. The contact sensitive device may thus further comprise an emitting transducer for exciting bending wave vibration in the member to probe for information relating to the contact. Information relating to the contact is calculated by comparing the response of waves generated by the emitting transducer to a mechanical constraint caused by the contact.

The member may be capable of supporting bending waves in the audio range. The contact sensitive device may thus be a loudspeaker such that an acoustic radiator of the loudspeaker acts as the member of the contact sensitive device and an exciter mounted on the acoustic radiator to excite bending wave vibration in the acoustic radiator to produce an acoustic output acts as the emitting transducer of the contact sensitive device.

The contact sensitive device may further comprise display screen, e.g. for presenting information related to the contact which is calculated by the processor. Thus, according to a further aspect of the present invention, there is provided a display screen which is a contact sensitive device. The display screen may be a liquid crystal display screen comprising liquid crystals which may be used to excite and/or sense bending waves. The screen may be capable of supporting bending waves over a broad frequency range. Direct contact to the screen may trigger the contact sensitive device. This application therefore affords the possibility to make a standard LCD screen touch sensitive with no additional mechanical parts.

Since the method may be adapted to complex shapes, a contact sensitive device according to the invention may be included in a mobile phone, a laptop computer or a personal data assistant. For example, the keypad conventionally fitted to a mobile phone may be replaced by a continuous moulding which is touch sensitive according to the present invention. This approach may decrease costs and provide an extended area for use in audio applications. In a laptop, the touchpad which functions as a mouse controller may be replaced by a continuous moulding which is a contact sensitive device according to the invention. The moulding may be implemented as a mouse controller or other alternatives, e.g. a keyboard.

The advantages of the bending wave contact sensitive device and method compared to other technologies are:

1) A more versatile technology which is sensitive to both location and pressure of the contact;
2) A cheaper form of contact sensitive device since there is no requirement for an array of transparent contacts or a complex sensor of a magnetic tip, etc.;
3) The device is readily scaleable in size and spatial sensitivity by control of the material parameters of the member; and
4) By using a dual functioning member, good quality sound may be achieved within tight spatial and weight constraints.

BRIEF DESCRIPTION OF THE DRAWING

Examples that embody the best mode for carrying out the invention are described in detail below and diagrammatically illustrated in the accompanying drawing, in which.

DETAILED DESCRIPTION

Figure 1:
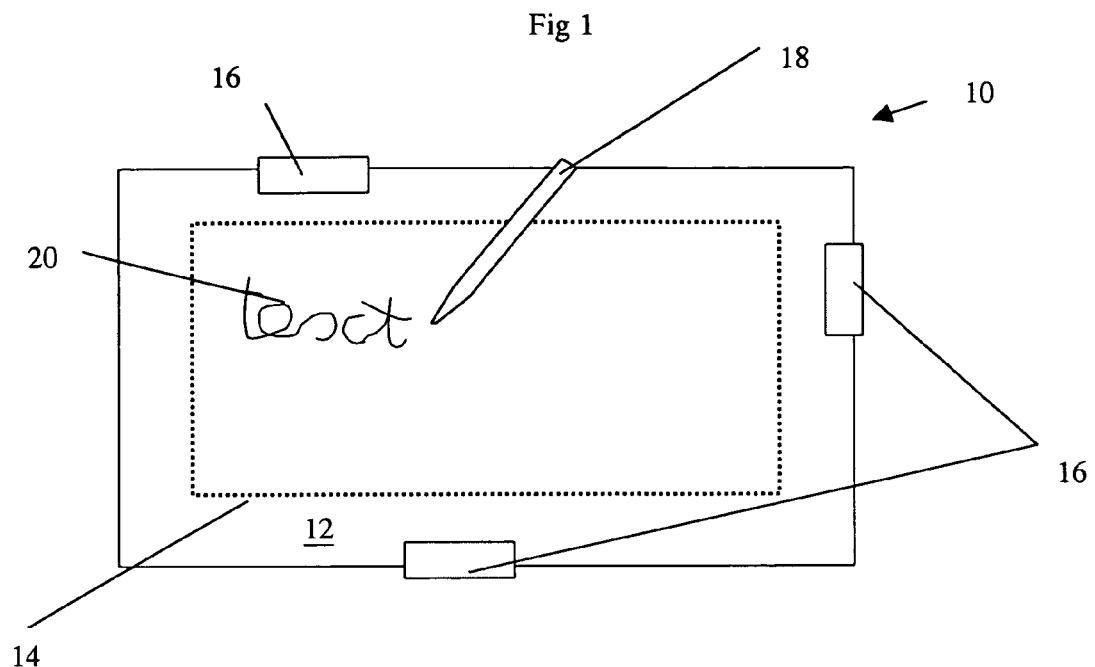
FIG. 1 is a schematic front view of a touch sensitive device according to the present invention.

FIG. 1 shows a contact sensitive device (10) comprising a transparent touch sensitive plate (12) mounted in front of a display device (14). The display device (14) may be in the form of a television, a computer screen or other visual display device. A stylus (18) in the form of a pen is used for writing text (20) or other matter on the touch sensitive plate (12).

The transparent touch sensitive plate (12) is also an acoustic device capable of supporting bending wave vibration. Three transducers (16) are mounted on the plate (12). At least two of the transducers (16) are sensing transducers or sensors and are thus sensitive to and monitor bending wave vibration in the plate. The third transducer (16) may also be a sensing transducer so that the system corresponds to the passive contact sensitive device of FIG. 3 or FIG. 4.

Figure 6:
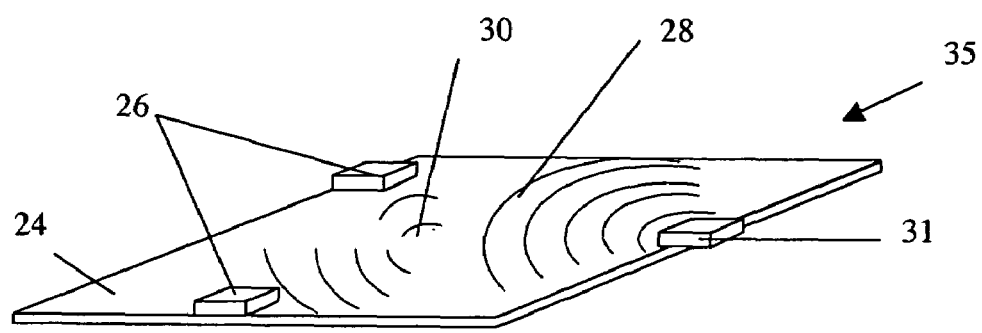
FIG. 6 is a schematic perspective view of a first example of a device incorporating active touch sensing according to a second embodiment of the present invention.
Figure 7:
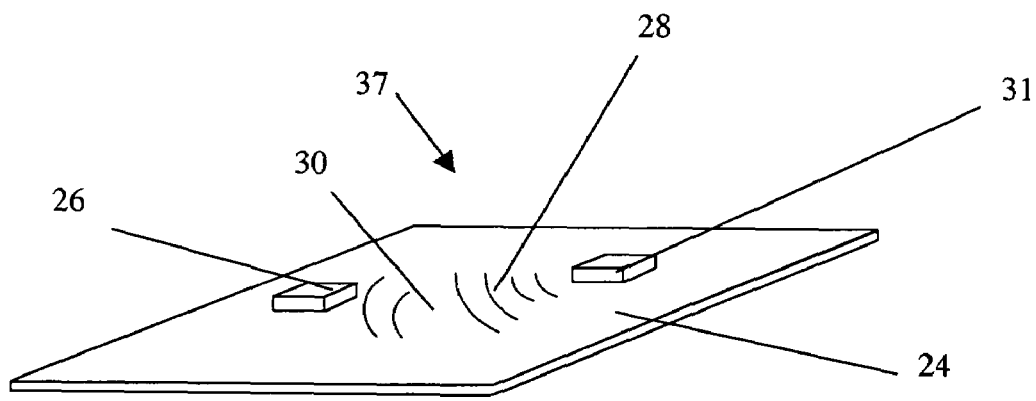
FIG. 7 is a schematic perspective view of a second example of a device incorporating active touch sensing according to the second embodiment of the present invention.

Alternatively, the third transducer may be an emitting transducer for exciting bending wave vibration in the plate so that the system corresponds to the active embodiment of FIGS. 6 and 7, which may act as a combined loudspeaker and contact sensitive device.

Figure 2A:
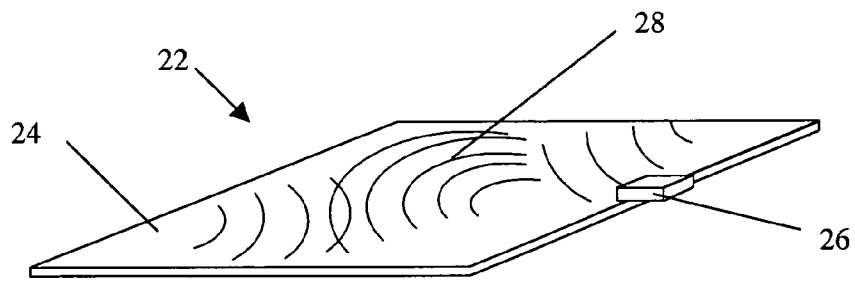
FIGS. 2a and 2b are schematic perspective views of a bending wave device before and after contact is applied.
Figure 2B:
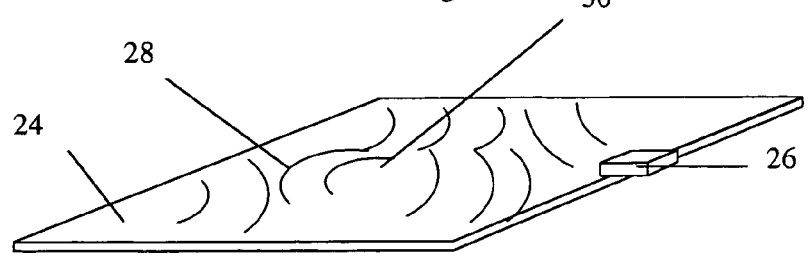

FIGS. 2a and 2b illustrate the general principles of a contact sensitive device (22) using bending wave vibration as the sensing element. The contact sensitive device (22) comprises a panel (24) capable of supporting bending wave vibration and a sensing transducer (26) mounted on the panel (24) to sense bending wave vibration in the panel (24) at the point where the sensing transducer (26) is mounted. FIG. 2a shows the vibration pattern (28) of bending wave vibration, in this case the normal uninterrupted vibration pattern, e.g. that of steady state at a given frequency, or a transient pulse.

In FIG. 2b, contact has been made to the panel (24) at contact point (30) and the pattern of vibration is altered. Contact may alter the vibration pattern (28) either by disturbing the path of bending waves already in the panel (24) or by generating new bending waves which emanate from the contact point (30). The change in vibration pattern (28) is sensed by the sensing transducer (26). Information relating to the contact may be determined from the readings of the sensing transducer, for example, by a first processing unit. The information may be relayed to a second processing unit which outputs the information on a display screen. The information may include details of the location and pressure profile of the contact impulse, for example:

1) The x,y co-ordinates of the contact.
2) The characteristic size of the contact, e.g. 1 mm corresponds to a pen or stylus, 1 cm corresponds to a finger.
3) Profile of pressure of contact as a function of time.

Figure 3:
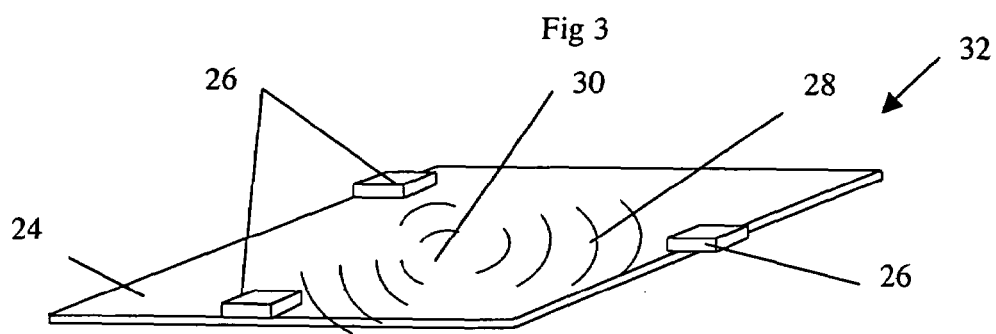
FIG. 3 is a schematic perspective view of a first example of a device incorporating passive touch sensing according to a first embodiment of the present invention.
Figure 4:
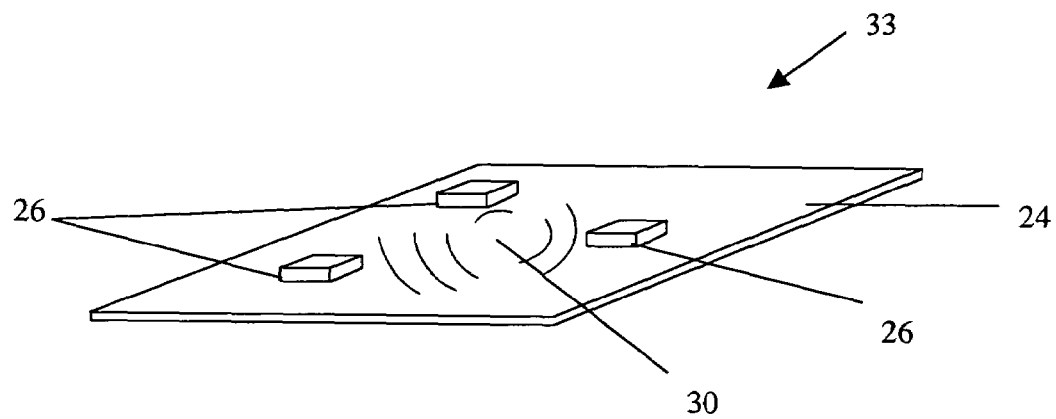
FIG. 4 is a schematic perspective view of a second example of a device incorporating passive touch sensing according to the first embodiment of the present invention.

FIGS. 3 and 4 are more detailed illustrations of two contact sensitive devices (32,33). Each of the contact sensitive devices (32,33) comprises a panel (24) capable of supporting bending wave vibration and three sensing transducers (26) for sensing bending wave vibration at their respective mounting points. The vibration pattern (28) is created when pressure is applied at a contact point (30). The devices may be considered to be passive contact sensitive devices since the devices do not comprise an emitting transducer. Thus the bending wave panel vibration in the panel is generated solely by the contact.

In a passive sensor an impulse in the body of the panel (24) starts a bending wave travelling towards the edge of the panel (24). The bending wave is detected by the three sensing transducers (26) mounted equidistantly around the edges as in FIG. 3, or by the three sensing transducer mounted on a surface of the panel (24) but spaced from the edges of the panel (24) as in FIG. 4. The measured bending wave signals are processed to determine the spatial origin and force profile of the applied impulse.

Figure 5:
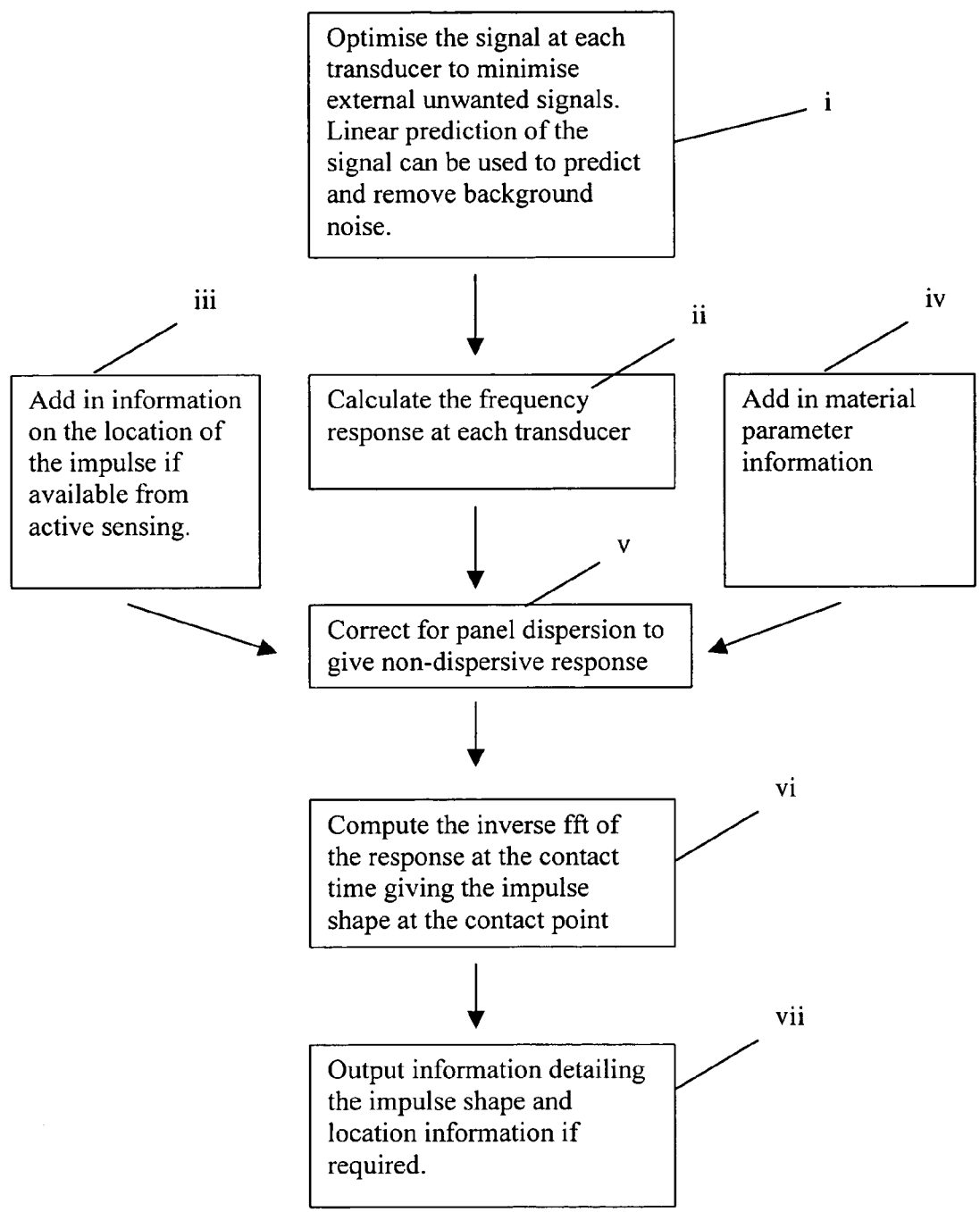
FIG. 5 is a block diagram of a processing algorithm for passive sensing according to the first embodiment of the present invention.

FIG. 5 shows an algorithm for the processing of the bending wave information sensed at each sensing transducer (26) of FIG. 3 or FIG. 4. The algorithm comprises the following steps:

i) Optimise the signal at each sensing transducer to minimize external unwanted signals. Linear prediction of the signal can be used to predict and remove background noise.
ii) Calculate the frequency response at each transducer.
iii) (Optional) Add in information on the location of the contact impulse if available from active sensing.
iv) Add in material parameter information.
v) Using the information available from steps (ii), (iii) and (iv), correct for panel dispersion to give non-dispersive response.
vi) Compute the inverse fft of the response at the contact time giving the impulse shape at the contact point.
vii) Output information detailing the impulse shape and location information if required.

Advantages of passive sensing include:

1) the method encompasses more than one frequency and includes sufficient frequency content required to image the impulse shape, and
2) as the method is passive the power requirements are minimal.

One disadvantage of passive sensing is that the frequency content of the measured signal is limited by the frequency content of the impulse. Consequently the high frequency information is limited, which translates into a relatively long bending wavelength. The spatial resolution of the signal is therefore limited.

FIGS. 6 and 7 are more detailed illustrations of alternative combined touch sensitive and audio devices (35,37). The devices each comprise a panel (24) capable of supporting bending wave vibration and an emitting transducer (31) for exciting bending wave vibration in the panel (24). The device (35) in FIG. 6 further comprises two additional sensing transducers (26) for sensing bending wave vibration at their respective mounting points, whereas the device (37) in FIG. 7 comprises one additional sensing transducer (26). The vibration pattern (28) is interrupted when pressure is applied at a contact point (30). The devices may be considered to be active contact sensitive devices since the devices comprise an emitting transducer (31).

In FIG. 6 the sensing and emitting transducers (26,31) are spaced equidistantly around the edges of the panel (24), whereas in FIG. 7 the sensing and emitting transducers (26,31) are distanced from the edges of the panel (24) and are mounted to a surface thereof. The transducers in FIG. 7 are spaced equally on the surface of the panel.

Figure 8:
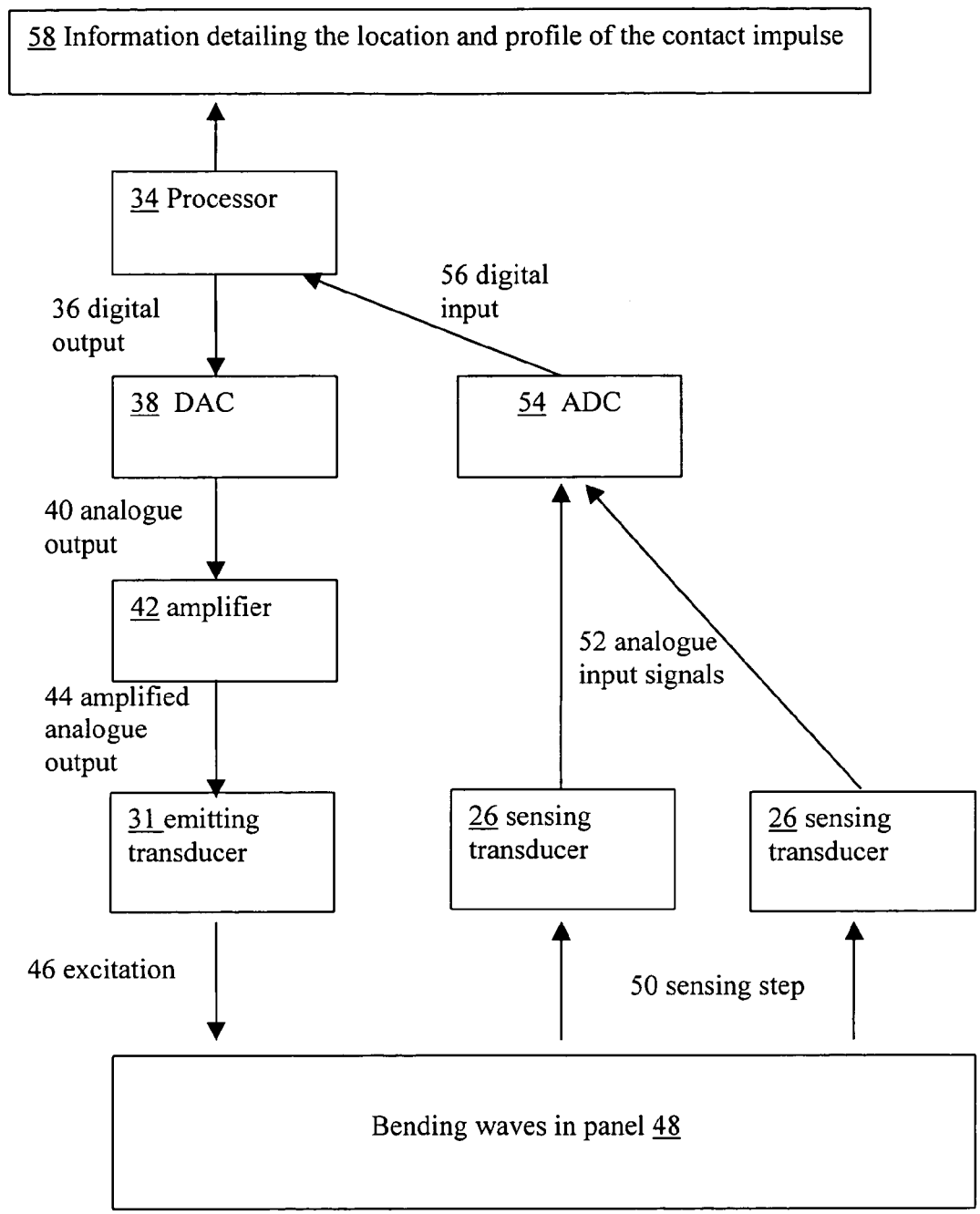
FIG. 8 is a block diagram of an implementation topology of the present invention.
Figure 9:
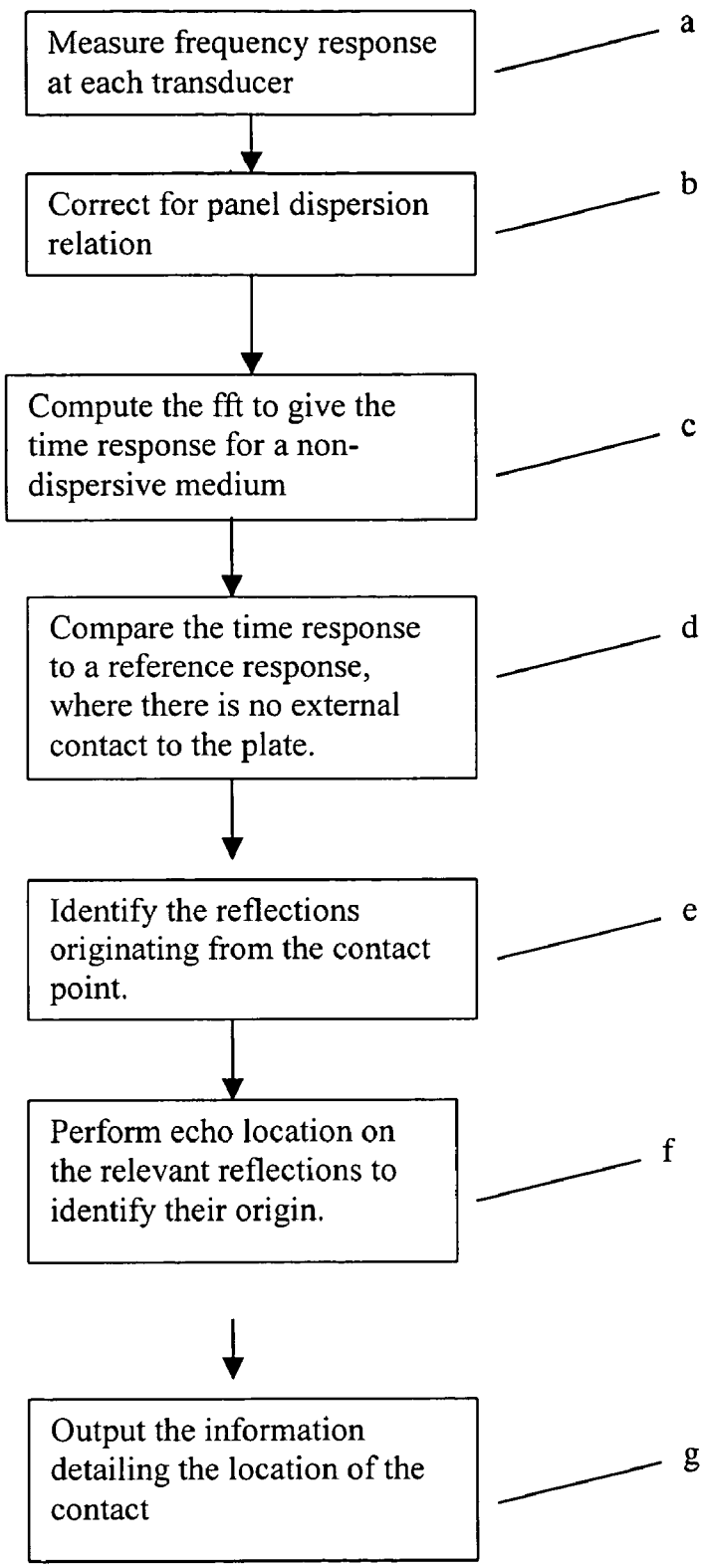
FIG. 9 is a block diagram of a processing algorithm for active sensing according to the second embodiment of the present invention.

FIGS. 8 and 9 illustrate possible implementations of the active contact sensitive device. In FIG. 8, the central processor (34) outputs a digital output signal (36) which is converted by the digital to analogue converter (DAC) (38) to an analogue output signal (40). The analogue output signal (40) is fed to an amplifier (42) which feeds an amplified analogue output signal (44) to the emitting transducer (31). The emitting transducer (31) emits bending wave excitation (46) which excites bending waves in the panel (48).

The bending waves in the panel (48) are sensed at sensing step (50) by two sensing transducers (26). The sensing transducers (26) convert the bending wave vibration into analogue input signals (52) which are fed into an input analogue to digital converter (ADC) (54). The resultant digital input signal (56) is transmitted to the central processor (34) from which information (58) relating to the location and profile of the contact impulse is determined.

In FIG. 9, there is shown a method for determining the location of the contact point. The steps are as follows and may be performed by the central processor shown in FIG. 8:
a) Measure frequency response at each sensing transducer.
b) Correct for panel dispersion relation.
c) Compute the fft to give the time response for a non-dispersive medium.
d) Compare the time response to a reference response, where there is no external contact to the panel.
e) Identify the reflections originating from the contact point.
f) Perform echo location on the relevant reflections to identify their origin.
g) Output the information detailing the location of the contact.

Advantages of active sensing include:
1) As the technique measures the response to an external signal, high frequency information is not limited and a high spatial resolution is possible.
2) The susceptibility to external noise can be greatly reduced. This can be achieved by sensing the response in a frequency band where the external noise is small, such as above the audible spectrum. An alternative is to give the signal a particular correlation, enabling its detection even when small compared to the background noise.

Disadvantages of active sensing include:
1) The technique is likely to be less sensitive to the profile of the impulse than the passive scheme. However, more sophisticated processing may improve this situation. For example, the greater the pressure of a finger or pen the larger the degree of extra damping likely to be introduced. This may be identified by a relative simple extra processing of the data.
2) The need for an external signal is likely to require more power than the passive measurement. This drawback can be minimized by making the exciting signal as small as possible. Also, when the exciting signal is at high frequency piezo transducers may be employed, which have the advantage of a very high efficiency.

In many applications the one single implementation of the bending wave contact sensitive device may not be general enough to cope with all situations. For example a passive sensor will work well when there is no audio being played through the device. However, when loud music is being played, an active sensor, either at frequencies out of the audio band or using the musical signal as the stimulus, is more suited. Therefore a combination of more than one particular implementation may prove to be the best solution. Furthermore, in the transition region between the passive and active sensing there may be useful information obtainable from both techniques.

Figure 10A:
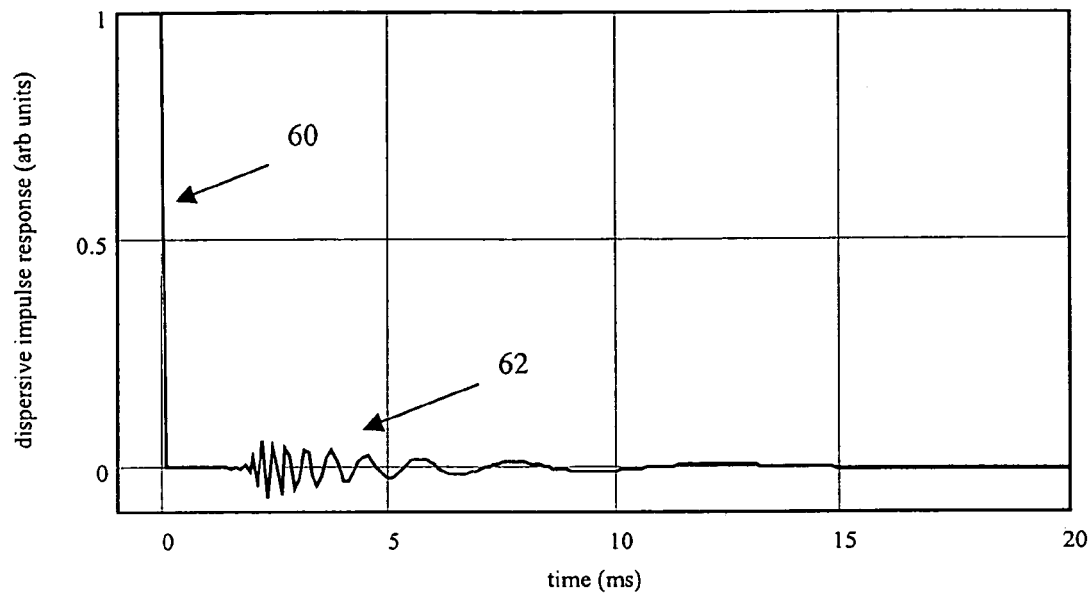
FIGS. 10a to 10d are graphic illustrations of a method of dispersion correction.
Figure 10B:
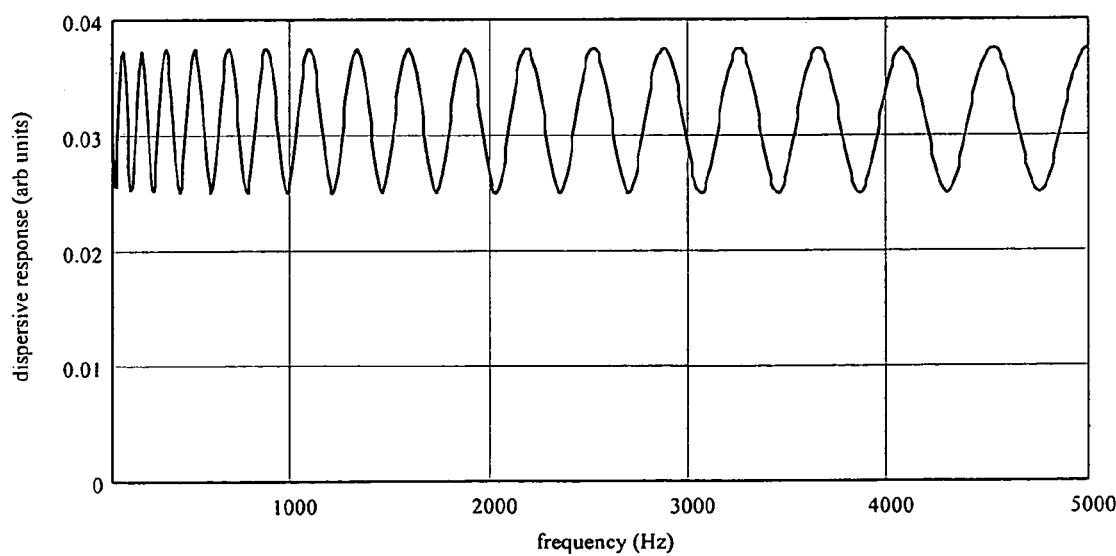
Figure 10C:
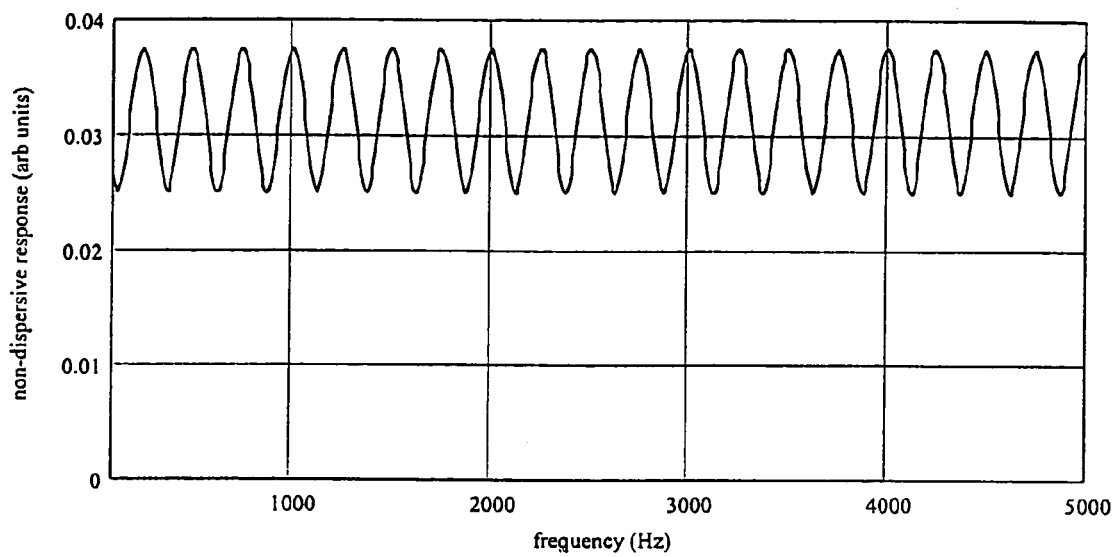
Figure 10D:
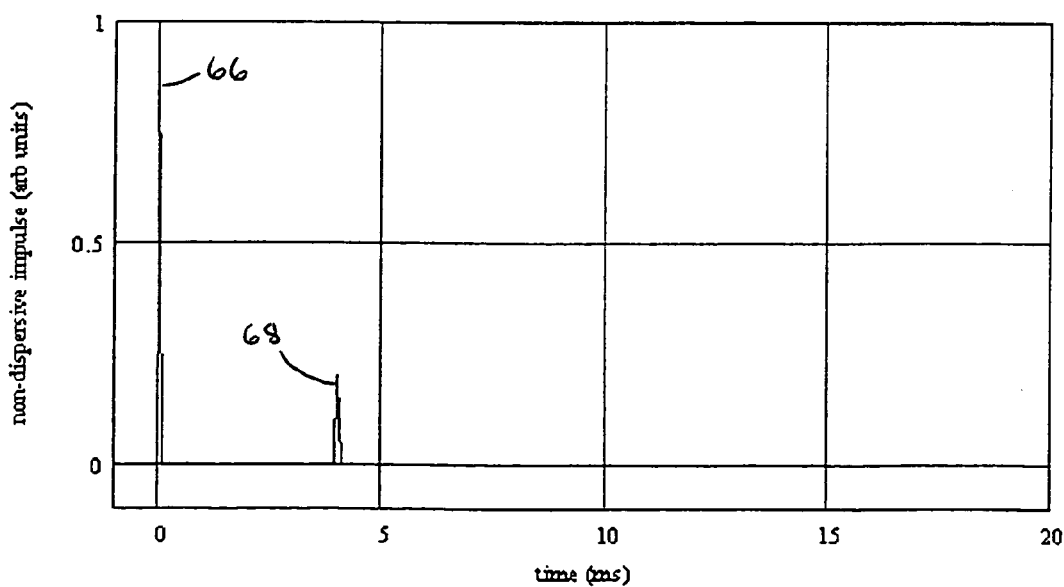

FIGS. 10a to 10d show the steps in one possible method of correcting to convert the measured bending wave signal to a propagation signal from a non-dispersive medium. FIG. 10a is a graph of a dispersive impulse response showing response in arbitrary units against time. FIG. 10b is a graph of a dispersive frequency response showing response in arbitrary units against frequency. FIG. 10c is a graph of a non-dispersive frequency response showing response in arbitrary units against frequency. FIG. 10d is a graph of a non-dispersive impulse response showing response in arbitrary units against time.

For pure plate bending, the wave speed is proportional to the square root of frequency, i.e. the high frequency component of any particular wave travels faster than the lower frequency components. FIG. 10a shows an impulse in an ideal medium with a square root dispersion relation and demonstrates that a dispersive medium does not preserve the wave shape of an impulse. The outgoing wave (60) is evident at time t=0 and the echo signal (62) is spread out over time, which makes a determination of an exact contact position problematic.

A periodic variation of the frequency response is characteristic of a reflection, and is often referred to as comb filtering. Physically, the periodic variation in the frequency response derives from the number of wavelengths that fit between the source and the reflector. As the frequency is increased and the number of wavelengths fitting in this space increases, the interference of the reflected wave with the outgoing wave oscillates between constructive and destructive.

Calculating the Fourier transform of the dispersive impulse response of FIG. 10a produces the frequency response shown in FIG. 10b. The frequency response is non-periodic and the periodic variation with wavelength translates to a variation in frequency that gets slower with increasing frequency. This is a consequence of the square root dispersion in which the wavelength is proportional to the square root of the inverse of frequency. The effect of the panel on the frequency response is therefore to stretch the response as a function of frequency according to the panel dispersion. Consequently, a correction for the panel dispersion may be applied by applying the inverse stretch in the frequency domain, thus restoring the periodicity present in the non-dispersive case.

By warping the frequency axis with the inverse of the panel dispersion, FIG. 10b may be transformed into the frequency response for the non-dispersive case (FIG. 10c) in which the frequency of excitation is proportional to the inverse of the wavelength. This simple relationship translates the periodic variation with decreasing wavelength to a periodic variation with increasing frequency as shown in FIG. 10c.

Applying the inverse Fast Fourier Transform (fft) to the trace of FIG. 10c produces an impulse response shown in FIG. 10d, which is corrected for dispersion and where the clear reflection is restored. As is shown in FIG. 10d, any particular wave shape of an impulse is preserved in time since the waves travelling in a non-dispersive medium have a constant velocity of travel, independent of their frequency. Accordingly, the task of echo location is relatively straightforward. The outgoing wave (66) is evident at time t=0, together with a clear reflection (68) at 4 ms. The reflection (68) has a magnitude which is approximately one-quarter of the magnitude of the outgoing wave (66).

The invention thus provides a novel and advantageous contact sensitive device, and a contact sensitive device combined with a bending wave panel acoustic device. Various modifications will be apparent to those skilled in the art without departing from the scope of the invention, which is define by the appended claims.

Incorporated herein by reference are UK priority application No. 9930404.0, filed Dec. 23, 1999; U.S. provisional application No. 60/171,603, filed Dec. 23, 1999; and U.S. provisional application No. 60/242,618, filed Oct. 23, 2000.

The invention claimed is:

1. A method of determining information relating to a contact on a passive contact sensitive device comprising the steps of:
   providing a member capable of supporting bending wave vibration,
   contacting the member at a discrete location to generate bending wave vibration in the member,
   measuring the bending wave vibration in the member to determine a measured bending wave signal, and
   processing the measured bending wave signal to calculate information relating to the contact including applying a correction to convert the measured bending wave signal to a propagation signal from a non-dispersive wave source.

2. A method according to claim 1, wherein the correction applied is based on a dispersion relation of the material of the member.

3. A method according to claim 2, wherein the dispersion relation is modeled by using the bending wave equation in combination with known physical parameters of the material of the member.

4. A method according to claim 2, wherein the dispersion relation is measured by using a laser vibrometer to create an image of the vibration pattern in the member for a number of given frequencies to give the dispersion relation in the frequency range of interest.

5. A method according to claim 2, wherein the dispersion relation is measured using a self-measuring scheme which is incorporated into the contact sensitive device.

6. A method according to claim 1, wherein the information relating to the contact comprises the location of the contact.

7. A method according to claim 1, wherein the information relating to the contact comprises the pressure of the contact.

8. A method according to claim 1, wherein the information relating to the contact comprises the size of the contact.

9. A method according to claim 1, wherein movement of the contact on the member generates a continuous signal which is affected by the location, pressure and speed of the contact on the member, and continuous time data from the continuous signal is used to derive additional information relating to the contact.

10. A method according to claim 9, wherein a neural net is used for processing continuous time data.

11. A method according to claim 1, wherein the contact type is selected from the group consisting of touch by a stylus and touch by a finger.

12. A method according to claim 11, wherein the measuring step comprises measuring the frequency content of the measured bending wave signal to determine the contact type.

13. A method according to claim 1, wherein the measuring step comprises measuring the frequency content of the measured bending wave signal to determine the contact type.

14. A method according to claim 1, wherein the member has a complex shape, and the processing step comprises using an adaptive algorithm to derive information relating to the contact from the measuring bending wave signal.

15. A method according to claim 14, wherein the adaptive algorithm is implemented in a neural net.

16. A method according to claim 1, wherein the bending wave vibration in the member is caused by background noise.

17. A method according to claim 1, further comprising the step of comparing the measured bending wave signal with a reference signal to identify when contact is made.

18. A method according to claim 1, wherein the measuring step comprises measuring the bending wave vibration at an edge of the member.

19. A method according to claim 1, wherein the measuring step comprises measuring the bending wave vibration at a position spaced from the edges of the member.

20. A method of determining information relating to a contact on a contact sensitive device comprising:
   contacting a member capable of supporting bending waves to produce a change in bending wave vibration in the member;
   measuring the changed bending wave vibration in the member to determine a measured bending wave signal; and
   processing the measured bending wave signal to calculate information relating to the contact, wherein processing the measured bending wave signal comprises applying a correction to convert the measured bending wave signal to a propagation signal from a non-dispersive wave source.

21. A method according to claim 20 wherein the contact sensitive device is passive and the change in bending wave vibration in the member induced by the contact is an excitation to bending wave vibration in the member.

22. A method according to claim 20 wherein the contact sensitive device is active and the method further comprises generating bending wave vibration in the member to probe for information relating to the contact, and wherein the change in bending wave vibration is a response of the generated bending wave vibration to the contact.

23. A method according to claim 22, wherein the effect of the contact is reflective, such that at least some of the generated bending wave vibration is reflected by the contact to produce a change in the generated bending wave vibration in the member.

24. A method according to claim 23, wherein the effect of the contact on the generated bending wave vibration is measured using indirect excitation from at least one boundary reflection.

25. A method according to claim 22, wherein the effect of the contact is absorbing, such that at least some of the generated bending wave vibration is absorbed by the contact to produce a change in the generated bending wave vibration in the member.

26. A method according to claim 25, wherein the effect of the contact on the generated bending wave vibration is measured using indirect excitation from at least one boundary reflection.

27. A method according to claim 22, wherein the generated bending wave vibration is not acoustically obvious.

28. A method according to claim 27, wherein the generated bending wave vibration simulates background noise.

29. A method according to claim 27, wherein the generated bending wave vibration is outside the audible frequency range.

30. A method according to claim 29, wherein the generated bending wave vibration is in the ultrasonic frequency range.

31. A method according to claim 22, wherein the generated bending wave vibration creates an acoustic output in the member, which acts as an acoustic radiator of a loudspeaker.

32. A method according to claim 31, wherein the processing step comprising isolating undesired signals from the changed bending wave vibration produced by the contact.

33. A method according to claim 22, wherein the processing step comprises isolating undesired signals from the changed bending wave vibration produced by the contact.

34. A method according to claim 22, wherein the correction applied is based on a dispersion relation of the material of the member.

35. A method according to claim 34, wherein the dispersion relation is modeled by using the bending wave equation in combination with known physical parameters of the material of the member.

36. A method according to claim 34, wherein the dispersion relation is measured by using a laser vibrometer to create an image of the vibration pattern in the member for a number of given frequencies to give the dispersion relation in the frequency range of interest.

37. A method according to claim 34, wherein the dispersion relation is measured using a self-measuring scheme which is incorporated into the contact sensitive device.

38. A method according to claim 22, wherein the information relating to the contact comprises the location of the contact.

39. A method according to claim 22, wherein the information relating to the contact comprises the pressure of the contact.

40. A method according to claim 22, wherein the information relating to the contact comprises the size of the contact.

41. A method according to claim 22, wherein movement of the contact on the member generates a continuous signal which is affected by the location, pressure and speed of the contact on the member, and continuous time data from the continuous signal is used to derive additional information relating to the contact.

42. A method according to claim 41, wherein a neural net is used for processing continuous time data.

43. A method according to claim 22, wherein the contact type is selected from the group consisting of touch by a stylus and touch by a finger.

44. A method according to claim 43, wherein the measuring step comprising measuring the frequency content of the measured bending wave signal to determine the contact type.

45. A method according to claim 22, wherein the measuring step comprises measuring the frequency content of the measured bending wave signal to determine the contact type.

46. A method according to claim 22, wherein the member has a complex shape, and the processing step comprises using an adaptive algorithm to derive information relating to the contact from the measuring bending wave signal.

47. A method according to claim 46, wherein the adaptive algorithm is implemented in a neural net.

48. A method according to claim 22, further comprising the step of comparing the measured bending wave signal with a reference signal to identify when contact is made.

49. A method according to claim 22, wherein the measuring step comprises measuring the changed bending wave vibration at an edge of the member.

50. A method according to claim 22, wherein the measuring step comprises measuring the changed bending wave vibration at a position spaced from the edges of the member.

51. A passive contact sensitive device comprising:
a member capable of supporting bending wave vibration,
at least one sensor coupled to the member for measuring bending wave vibration in the member, and
a processor operatively coupled to the at least one sensor for processing information relating to a contact made on a surface on the member from the generation of bending wave vibration in the member created by the contact and measured by the at least one sensor and for applying a correction to convert the measured bending wave signal to a propagation signal from a non-dispersive wave source.

52. A contact sensitive device according to claim 51, wherein the member is a display screen.

53. A contact sensitive device according to claim 52, wherein the display screen is a liquid crystal display screen, and the at least one sensor comprises liquid crystals of the display screen which sense bending wave vibration in the member.

54. A contact sensitive device according to claim 51, wherein the at least one sensor is mounted at an edge of the member.

55. A contact sensitive device according to claim 51, wherein the at least one sensor is mounted on the member spaced from an edge of the member.

56. A contact sensitive device according to claim 51, wherein the member is transparent.

57. A contact sensitive device according to claim 51, wherein the member is in the form of a panel.

58. A contact sensitive device according to claim 51, wherein the member has uniform thickness.

59. A mobile phone comprising a contact sensitive device according to claim 51.

60. A lap-top comprising a contact sensitive device according to claim 51.

61. A personal data assistant comprising a contact sensitive device according to claim 51.

62. A contact sensitive device comprising:
a member capable of supporting bending wave vibration;
at least one sensor coupled to the member for measuring bending wave vibration in the member, and
a processor operatively coupled to the at least one sensor for processing information relating to a contact made on a surface on the member from a change in bending wave vibration in the member caused by the contact and measured by the at least one sensor and for applying a correction to convert the measured bending wave signal to a propagation signal from a non-dispersive wave source.

63. A contact sensitive device according to claim 62 wherein the contact sensitive device is passive and the change in bending wave vibration in the member induced by the contact is an excitation to bending wave vibration in the member.

64. A contact sensitive device according to claim 62 further comprising:
an emitting transducer for exciting bending wave vibration in the member to probe for information relating to the contact, and
wherein the change in bending wave vibration is a response of the excited bending wave vibration to the contact.

65. A contact sensitive device according to claim 64, wherein information relating to the contact is calculated by comparing the measured bending wave signal to a reference signal before contact is made.

66. A contact sensitive device according to claim 64, wherein the emitting transducer has dual functionality and acts as the emitting transducer and the at least one sensor.

67. A contact sensitive device according to claim 64, wherein the emitting transducer and the at least one sensor are placed with a relatively equal spacing around the periphery of the member.

68. A contact sensitive device according to claim 64, wherein the emitting transducer and the at least one sensor are located at the same point and are coupled into orthogonal physical properties.

69. A contact sensitive device according to claim 64, wherein the member is a display screen.

70. A contact sensitive device according to claim 69, wherein the display screen is a liquid crystal display screen, and the at least one sensor comprises liquid crystals of the display screen which sense bending wave vibration in the member.

71. A contact sensitive device according to claim 64, wherein the at least one sensor is mounted at an edge of the member.

72. A contact sensitive device according to claim 64, wherein the at least one sensor is mounted on the member spaced from an edge of the member.

73. A contact sensitive device according to claim 64, wherein the member is transparent.

74. A contact sensitive device according to claim 64, wherein the member is in the form of a panel.

75. A contact sensitive device according to claim 64, wherein the member has uniform thickness.

76. A mobile phone comprising a contact sensitive device according to claim 64.

77. A lap-top computer comprising a contact sensitive device according to claim 64.

78. A personal data assistant comprising a contact sensitive device according to claim 64.

79. A method of determining information relating to a contact on a passive contact sensitive device comprising the steps of:

providing a member capable of supporting bending wave vibration, contacting the member to generate bending wave vibration in the member by frictional movement of the contact, measuring the bending wave vibration in the member to determine a measured bending wave signal, and processing the measured bending wave signal to calculate information relating to the contact.

80. A method according to claim 79, further comprising the step of applying a correction to convert the measured bending wave signal to a propagation signal from a non-dispersive wave source.

* * * * *

UNITED STATES PATENT AND TRADEMARK OFFICE
CERTIFICATE OF CORRECTION

| | | |
|---|---|---|
| PATENT NO. | : 7,157,649 B1 | Page 1 of 1 |
| APPLICATION NO. | : 09/746405 | |
| DATED | : January 2, 2007 | |
| INVENTOR(S) | : Nicholas P. R. Hill | |

It is certified that error appears in the above-identified patent and that said Letters Patent is hereby corrected as shown below:

Col. 15, line 43 (Claim 44), replace "comprising" with --comprises--

Signed and Sealed this

Tenth Day of April, 2007

JON W. DUDAS
*Director of the United States Patent and Trademark Office*